(12) United States Patent
Rosa et al.

(10) Patent No.: US 10,306,566 B2
(45) Date of Patent: May 28, 2019

(54) METHOD AND APPARATUS

(71) Applicant: Nokia Solutions and Networks Oy, Espoo (FI)

(72) Inventors: Claudio Rosa, Randers (DK); Esa Malkamäki, Espoo (FI); Kari Juhani Hooli, Oulu (FI); Jari Olavi Lindholm, Palojoki (FI); Mauri Johannes Nissilä, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 129 days.

(21) Appl. No.: 15/115,290

(22) PCT Filed: Mar. 28, 2014

(86) PCT No.: PCT/EP2014/056364
§ 371 (c)(1),
(2) Date: Jul. 29, 2016

(87) PCT Pub. No.: WO2015/113651
PCT Pub. Date: Aug. 6, 2015

(65) Prior Publication Data
US 2017/0150452 A1 May 25, 2017

(30) Foreign Application Priority Data
Jan. 31, 2014 (WO) .................. PCT/EP2014/051913

(51) Int. Cl.
*H04W 52/34* (2009.01)
*H04W 52/14* (2009.01)
(Continued)

(52) U.S. Cl.
CPC .......... *H04W 52/346* (2013.01); *H04L 1/005* (2013.01); *H04W 52/0219* (2013.01);
(Continued)

(58) Field of Classification Search
None
See application file for complete search history.

(56) References Cited

U.S. PATENT DOCUMENTS 9,520,984 B2 * 12/2016 Yang .................... H04W 52/146
9,763,199 B2 * 9/2017 Pelletier .............. H04W 52/146
(Continued)

FOREIGN PATENT DOCUMENTS

| EP | 2 400 803 A2 | 12/2011 |
|---|---|---|
| WO | WO-2010/050295 A1 | 5/2010 |
| WO | WO 2013/025562 A2 | 2/2013 |

OTHER PUBLICATIONS

3GPP TSG-Ran WG2 #84, San Francisco, USA, Nov. 11-15, 2013, Tdoc R2-134234, "Considerations on power control for Dual Connectivity", Ericsson, 4 pgs.*
(Continued)

*Primary Examiner* — Christopher M Crutchfield
*Assistant Examiner* — Thinh D Tran
(74) *Attorney, Agent, or Firm* — Harrington & Smith (57) ABSTRACT

A method includes determining a first transmission power for a first transmission from a user equipment and a second transmission power for a second transmission from the user equipment, the first and second transmission at least partially overlapping, the first and second transmission power being selected in dependence on at least one of which one or more channels are being transmitted and information on the at least one or more channels.

18 Claims, 5 Drawing Sheets

(51) Int. Cl.

| | | |
|---|---|---|
| | H04W 52/22 | (2009.01) |
| | H04W 52/36 | (2009.01) |
| | H04W 52/28 | (2009.01) |
| | H04L 1/00 | (2006.01) |
| | H04W 52/32 | (2009.01) |
| | H04W 52/02 | (2009.01) |
| | H04W 52/40 | (2009.01) |
| | H04W 88/08 | (2009.01) |

(52) U.S. Cl.
CPC ....... *H04W 52/146* (2013.01); *H04W 52/223* (2013.01); *H04W 52/226* (2013.01); *H04W 52/281* (2013.01); *H04W 52/325* (2013.01); *H04W 52/327* (2013.01); *H04W 52/34* (2013.01); *H04W 52/367* (2013.01); *H04W 52/365* (2013.01); *H04W 52/40* (2013.01); *H04W 88/08* (2013.01); *Y02D 70/1242* (2018.01); *Y02D 70/1262* (2018.01); *Y02D 70/1264* (2018.01); *Y02D 70/142* (2018.01); *Y02D 70/146* (2018.01)

(56) References Cited

U.S. PATENT DOCUMENTS

| | | |
|---|---|---|
| 2012/0178494 A1 | 7/2012 | Haim et al. .................. 455/522 |
| 2013/0176953 A1 | 7/2013 | Stern-Berkowitz et al. ............... 370/329 |
| 2016/0183203 A1* | 6/2016 | Larsson ............. H04W 52/241 370/329 |

OTHER PUBLICATIONS

U.S. Appl. No. 61/883,395, "Method and Arrangement for Power Control Handling" filed Sep. 27, 2013.*
LG Electronics Inc., Management of UE Transmit Power in Dual Connectivity [online], 3GPP TSG-RAN WG2 Meeting #84, 3GPP, Nov. 15, 2013. R2-134048, <URL:http://www.3gpp.org/ftp_ran/WG2_RL2/TSGR2_84/Docs/R2-134048.zip>.
3GPP TSG RAN WG1 #63 Meeting, Jacksonville, USA, Nov. 15-19, 2010, R1-106195, "Remaining issues on uplink power control", Nokia Siemens Networks, Nokia Corporation, 4 pgs.
3GPP TSG-RAN WG2 Meeting #83, Barcelona, Spain, Aug. 19-23, 2013, R2-132504, "Challenge on UL transmission of dual connectivity", Pantech, 8 pgs.

* cited by examiner

METHOD AND APPARATUS

Some embodiments relate to a method and apparatus and in particular but not exclusively to a method and apparatus for use in scenarios where a user device or equipment is in communication with two or more cells or base stations.

A communication system can be seen as a facility that enables communication sessions between two or more nodes such as fixed or mobile communication devices, access points such as nodes, base stations, servers, hosts, machine type servers, routers, and so on. A communication system and compatible communicating devices typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the devices and functionalities thereof shall be configured.

It should be understood that conveying, broadcasting, signalling, transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to the terms transmission and reception as well.

A user can access the communication system by means of an appropriate communication device. A communication device of a user is often referred to as user equipment (UE), user device or terminal.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, such systems being often referred to as cellular systems. A cell can be provided by a base station, there being various different types of base stations. Different types of cells can provide different features. For example, cells can have different shapes, sizes, functionalities and other characteristics. A cell is typically controlled by a control node.

A communication device is provided with an appropriate signal receiving and transmitting arrangement for enabling communications with other parties. In wireless systems a communication device typically provides a transceiver station that can communicate with another communication device such as e.g. a base station and/or another user equipment. A communication device such as a user equipment (UE) may access a carrier provided by a base station, and transmit and/or receive on the carrier.

An example of cellular communication systems is an architecture that is being standardized by the 3rd Generation Partnership Project (3GPP). A recent development in this field is often referred to as the long-term evolution (LTE) or long-term evolution advanced (LTE advanced) of the Universal Mobile Telecommunications System (UMTS) radio-access technology. In LTE base stations providing the cells are commonly referred to as enhanced NodeBs (eNB). An eNB can provide coverage for an entire cell or similar radio service area.

Cells can provide different service areas. For example, some cells may provide wide coverage areas while some other cells provide smaller coverage areas. The smaller radio coverage areas can be located wholly or partially within a larger radio coverage area. For example, in LTE a node providing a relatively wide coverage area is referred to as a macro eNode B. Examples of nodes providing smaller cells, or local radio service areas, include femto nodes such as Home eNBs (HeNB), pico nodes such as pico eNodeBs (pico-eNB) and remote radio heads.

A device may communicate with more than one cell. Communications with more than one cell may be provided e.g. to increase performance. Dual connectivity may be provided where a user device is configured to communicate both with a master eNB (MeNB) and a secondary eNB (SeNB).

According to an aspect, there is provided a method comprising: determining a first transmission power for a first transmission from a user equipment and a second transmission power for a second transmission from said user equipment, said first and second transmission at least partially overlapping, said first and second transmission power being selected in dependence on at least one of which one or more channels are being transmitted and information on said at least one or more channels.

The first transmission may be to a first base station and said second transmission may be to a second base station.

The first transmission may be to a master base station and said second transmission may be to a secondary base station.

The method may comprise using information on at least one of a first maximum power for said first transmission and a second maximum power for said second transmission to determine at least one of said first transmission power and said second transmission power.

The determining may comprise determining if the one or more channels and/or information being transmitted in said first transmission and one or more channels and/or information being transmitted in said second transmission is one of a plurality of combinations for which maximum powers are defined.

The one or more channels may comprise one or more of a physical uplink shared channel and a physical uplink control channel.

The information may comprise one or more of uplink control information.

The plurality of combinations may comprise one or more of:

physical uplink shared channel without uplink control information for the first transmission and physical uplink shared channel without uplink control information for the second transmission;

physical uplink shared channel with uplink control information and/or physical uplink control channel for the first transmission and physical uplink control channel without uplink control information for the second transmission;

physical uplink shared channel without uplink control information for the first transmission and physical uplink shared channel with uplink control information and/or physical uplink control channel for the second transmission;

physical uplink shared channel with uplink control information or physical uplink control channel for the first transmission and physical uplink shared channel with uplink control information or physical uplink control channel for the second transmission physical uplink shared channel without uplink control information for the first transmission and physical uplink shared channel and/or physical uplink control channel in the second transmission;

physical uplink shared channel with uplink control information and/or physical uplink control channel for the first transmission and physical uplink shared channel and/or physical uplink control channel in the second transmission;

physical uplink shared channel for the first transmission and physical uplink shared channel and/or physical uplink control channel in the second transmission; and physical uplink control channel for the first transmission and physical uplink shared channel and/or physical uplink control channel for the second transmission.

One of said first and second powers may exceed said respective maximum power if the other of said first and second powers is less than its respective maximum power.

The first power together with said second power may be less than or equal to a total maximum power.

The first maximum power and said second maximum power may be set in dependence on information received from a base station.

The user equipment is in a dual connectivity mode.

The method may be performed by an apparatus in a user equipment.

According to another aspect, there is provided a method comprising: configuring a plurality of maximum power splits between a first base station and a second base station for at least partially overlapping transmissions from a user equipment to said first base station and said second base station; each of said maximum power splits being dependent on one or more a channel to be transmitted by said user equipment and information provided on a respective channel, a maximum power split defining at least one of a first maximum transmission power to said first base station and a second maximum transmission power to said second base station.

The method may comprise providing information on said plurality of maximum power splits to said user equipment.

Each of said maximum power split may be associated with a different combination of one or more channels and/or information being transmitted in said first transmission and one or more channels and/or information being transmitted in said second transmission.

The first base station may be a master base station and said second base station may be a secondary base station.

The one or more channels may comprise one or more of a physical uplink shared channel and a physical uplink control channel.

The information may comprise one or more of uplink control information.

The plurality of combinations may comprise one or more of:

physical uplink shared channel without uplink control information for the first transmission and physical uplink shared channel without uplink control information for the second transmission;

physical uplink shared channel with uplink control information and/or physical uplink control channel for the first transmission and physical uplink control channel without uplink control information for the second transmission;

physical uplink shared channel without uplink control information for the first transmission and physical uplink shared channel with uplink control information and/or physical uplink control channel for the second transmission;

physical uplink shared channel with uplink control information or physical uplink control channel for the first transmission and physical uplink shared channel with uplink control information or physical uplink control channel for the second transmission physical uplink shared channel without uplink control information for the first transmission and physical uplink shared channel and/or physical uplink control channel in the second transmission;

physical uplink shared channel with uplink control information and/or physical uplink control channel for the first transmission and physical uplink shared channel and/or physical uplink control channel in the second transmission;

physical uplink shared channel for the first transmission and physical uplink shared channel and/or physical uplink control channel in the second transmission; and physical uplink control channel for the first transmission and physical uplink shared channel and/or physical uplink control channel for the second transmission.

According to an aspect, there is provided an apparatus comprising: means for determining a first transmission power for a first transmission from a user equipment and a second transmission power for a second transmission from said user equipment, said first and second transmission at least partially overlapping, said first and second transmission power being selected in dependence on at least one of which one or more channels are being transmitted and information on said at least one or more channels.

The first transmission may be to a first base station and said second transmission may be to a second base station.

The first transmission may be to a master base station and said second transmission may be to a secondary base station.

The apparatus may comprise means for using information on at least one of a first maximum power for said first transmission and a second maximum power for said second transmission to determine at least one of said first transmission power and said second transmission power.

The determining means may be for determining if the one or more channels and/or information being transmitted in said first transmission and one or more channels and/or information being transmitted in said second transmission is one of a plurality of combinations for which maximum powers are defined.

The one or more channels may comprise one or more of a physical uplink shared channel and a physical uplink control channel.

The information may comprise one or more of uplink control information.

The plurality of combinations may comprise one or more of:

physical uplink shared channel without uplink control information for the first transmission and physical uplink shared channel without uplink control information for the second transmission;

physical uplink shared channel with uplink control information and/or physical uplink control channel for the first transmission and physical uplink control channel without uplink control information for the second transmission;

physical uplink shared channel without uplink control information for the first transmission and physical uplink shared channel with uplink control information and/or physical uplink control channel for the second transmission;

physical uplink shared channel with uplink control information or physical uplink control channel for the first transmission and physical uplink shared channel with uplink control information or physical uplink control channel for the second transmission physical uplink shared channel without uplink control information for the first transmission and physical uplink shared channel and/or physical uplink control channel in the second transmission;

physical uplink shared channel with uplink control information and/or physical uplink control channel for the first transmission and physical uplink shared channel and/or physical uplink control channel in the second transmission;

physical uplink shared channel for the first transmission and physical uplink shared channel and/or physical uplink control channel in the second transmission; and physical uplink control channel for the first transmission and physical uplink shared channel and/or physical uplink control channel for the second transmission.

One of said first and second powers may exceed said respective maximum power if the other of said first and second powers is less than its respective maximum power.

The first power together with said second power may be less than or equal to a total maximum power.

The first maximum power and said second maximum power may be set in dependence on information received from a base station.

The user equipment is in a dual connectivity mode.

The apparatus may be in a user equipment.

According to another aspect, there is provided an apparatus comprising: means for configuring a plurality of maximum power splits between a first base station and a second base station for at least partially overlapping transmissions from a user equipment to said first base station and said second base station; each of said maximum power splits being dependent on one or more a channel to be transmitted by said user equipment and information provided on a respective channel, a maximum power split defining at least one of a first maximum transmission power to said first base station and a second maximum transmission power to said second base station.

The apparatus may comprise means for providing information on said plurality of maximum power splits to said user equipment.

Each of said maximum power split may be associated with a different combination of one or more channels and/or information being transmitted in said first transmission and one or more channels and/or information being transmitted in said second transmission.

The first base station may be a master base station and said second base station may be a secondary base station.

The one or more channels may comprise one or more of a physical uplink shared channel and a physical uplink control channel.

The information may comprise one or more of uplink control information.

The plurality of combinations may comprise one or more of:

physical uplink shared channel without uplink control information for the first transmission and physical uplink shared channel without uplink control information for the second transmission;

physical uplink shared channel with uplink control information and/or physical uplink control channel for the first transmission and physical uplink control channel without uplink control information for the second transmission;

physical uplink shared channel without uplink control information for the first transmission and physical uplink shared channel with uplink control information and/or physical uplink control channel for the second transmission;

physical uplink shared channel with uplink control information or physical uplink control channel for the first transmission and physical uplink shared channel with uplink control information or physical uplink control channel for the second transmission physical uplink shared channel without uplink control information for the first transmission and physical uplink shared channel and/or physical uplink control channel in the second transmission;

physical uplink shared channel with uplink control information and/or physical uplink control channel for the first transmission and physical uplink shared channel and/or physical uplink control channel in the second transmission;

physical uplink shared channel for the first transmission and physical uplink shared channel and/or physical uplink control channel in the second transmission; and physical uplink control channel for the first transmission and physical uplink shared channel and/or physical uplink control channel for the second transmission.

According to another aspect, there is provided an apparatus, said apparatus comprising at least one processor and at least one memory including computer code for one or more programs, the at least one memory and the computer code configured, with the at least one processor, to determine a first transmission power for a first transmission from a user equipment and a second transmission power for a second transmission from said user equipment, said first and second transmission at least partially overlapping, said first and second transmission power being selected in dependence on at least one of which one or more channels are being transmitted and information on said at least one or more channels.

The first transmission may be to a first base station and said second transmission may be to a second base station.

The first transmission may be to a master base station and said second transmission may be to a secondary base station.

The at least one memory and the computer code may be configured, with the at least one processor to use information on at least one of a first maximum power for said first transmission and a second maximum power for said second transmission to determine at least one of said first transmission power and said second transmission power.

The at least one memory and the computer code may be configured, with the at least one processor to determine if the one or more channels and/or information being transmitted in said first transmission and one or more channels and/or information being transmitted in said second transmission is one of a plurality of combinations for which maximum powers are defined.

The one or more channels may comprise one or more of a physical uplink shared channel and a physical uplink control channel.

The information may comprise one or more of uplink control information.

The plurality of combinations may comprise one or more of:

physical uplink shared channel without uplink control information for the first transmission and physical uplink shared channel without uplink control information for the second transmission;

physical uplink shared channel with uplink control information and/or physical uplink control channel for the first transmission and physical uplink control channel without uplink control information for the second transmission;

physical uplink shared channel without uplink control information for the first transmission and physical uplink shared channel with uplink control information and/or physical uplink control channel for the second transmission;

physical uplink shared channel with uplink control information or physical uplink control channel for the first transmission and physical uplink shared channel with uplink control information or physical uplink control channel for the second transmission physical uplink shared channel without uplink control information for the first transmission and physical uplink shared channel and/or physical uplink control channel in the second transmission;

physical uplink shared channel with uplink control information and/or physical uplink control channel for the first transmission and physical uplink shared channel and/or physical uplink control channel in the second transmission;

physical uplink shared channel for the first transmission and physical uplink shared channel and/or physical uplink control channel in the second transmission; and physical uplink control channel for the first transmission and physical uplink shared channel and/or physical uplink control channel for the second transmission.

One of said first and second powers may exceed said respective maximum power if the other of said first and second powers is less than its respective maximum power.

The first power together with said second power may be less than or equal to a total maximum power.

The first maximum power and said second maximum power may be set in dependence on information received from a base station.

The user equipment is in a dual connectivity mode.

The apparatus may be in a user equipment.

According to another aspect, there is provided an apparatus, said apparatus comprising at least one processor and at least one memory including computer code for one or more programs, the at least one memory and the computer code configured, with the at least one processor, to configure a plurality of maximum power splits between a first base station and a second base station for at least partially overlapping transmissions from a user equipment to said first base station and said second base station; each of said maximum power splits being dependent on one or more a channel to be transmitted by said user equipment and information provided on a respective channel, a maximum power split defining at least one of a first maximum transmission power to said first base station and a second maximum transmission power to said second base station.

The at least one memory and the computer code may be configured, with the at least one processor to provide information on said plurality of maximum power splits to said user equipment.

Each of said maximum power split may be associated with a different combination of one or more channels and/or information being transmitted in said first transmission and one or more channels and/or information being transmitted in said second transmission.

The first base station may be a master base station and said second base station may be a secondary base station.

The one or more channels may comprise one or more of a physical uplink shared channel and a physical uplink control channel.

The information may comprise one or more of uplink control information.

The plurality of combinations may comprise one or more of:

physical uplink shared channel without uplink control information for the first transmission and physical uplink shared channel without uplink control information for the second transmission;

physical uplink shared channel with uplink control information and/or physical uplink control channel for the first transmission and physical uplink control channel without uplink control information for the second transmission;

physical uplink shared channel without uplink control information for the first transmission and physical uplink shared channel with uplink control information and/or physical uplink control channel for the second transmission;

physical uplink shared channel with uplink control information or physical uplink control channel for the first transmission and physical uplink shared channel with uplink control information or physical uplink control channel for the second transmission physical uplink shared channel without uplink control information for the first transmission and physical uplink shared channel and/or physical uplink control channel in the second transmission;

physical uplink shared channel with uplink control information and/or physical uplink control channel for the first transmission and physical uplink shared channel and/or physical uplink control channel in the second transmission;

physical uplink shared channel for the first transmission and physical uplink shared channel and/or physical uplink control channel in the second transmission; and physical uplink control channel for the first transmission and physical uplink shared channel and/or physical uplink control channel for the second transmission.

The apparatus may be in a base station or network entity. An computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

Some embodiments will now be described, by way of example only, with respect to the following Figures in which.

Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively).

Figure 1:
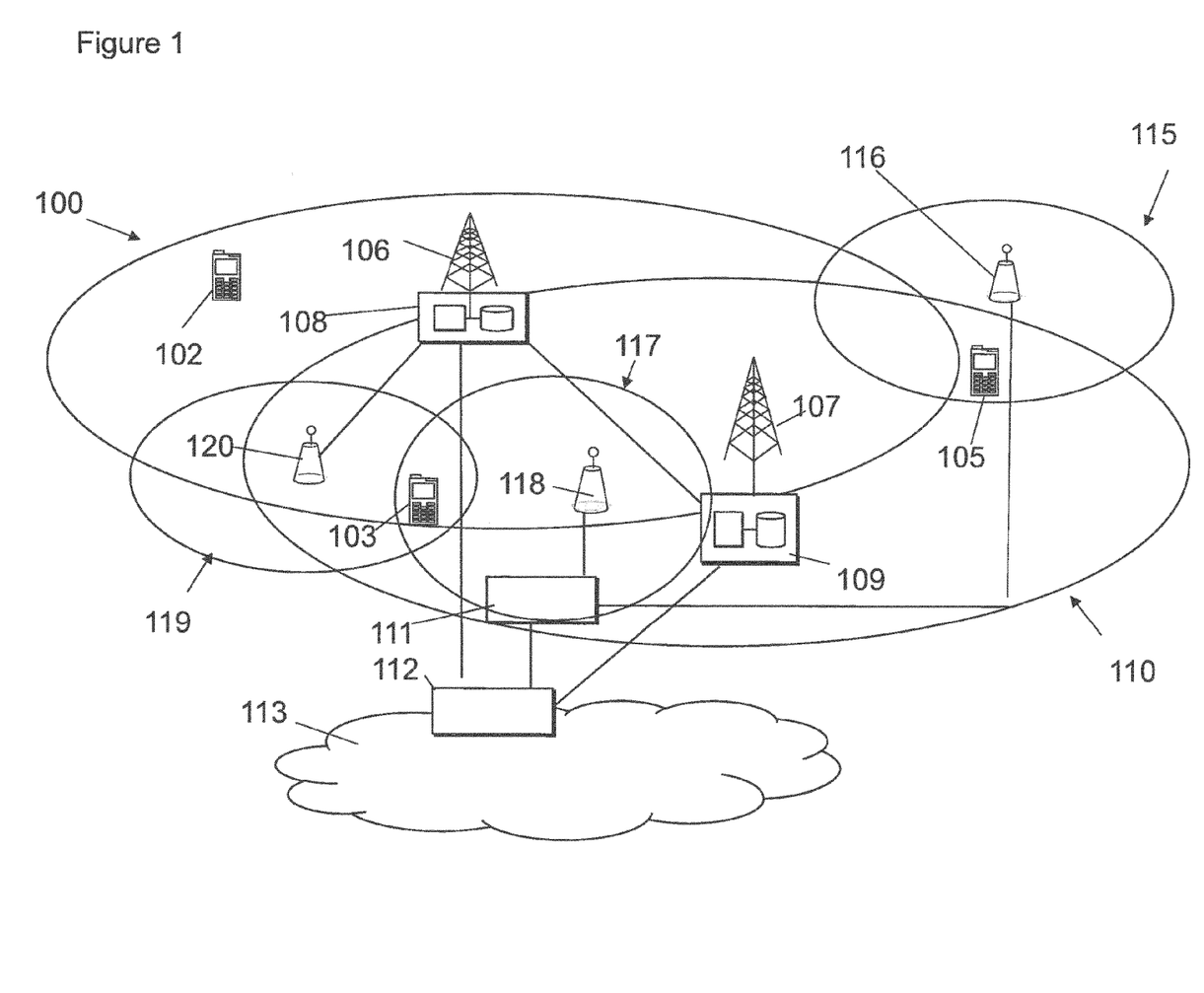
FIG. 1 shows a schematic diagram of a network according to some embodiments.

In FIG. 1 base stations 106 and 107 are shown as connected to a wider communications network 113 via gateway 112. A further gateway function may be provided to connect to another network. These may be macro base stations.

The smaller base stations 116, 118 and 120 may also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided. The smaller base stations may provide a femto cell, a pico cell, a micro cell, and/or the like.

Figure 2:
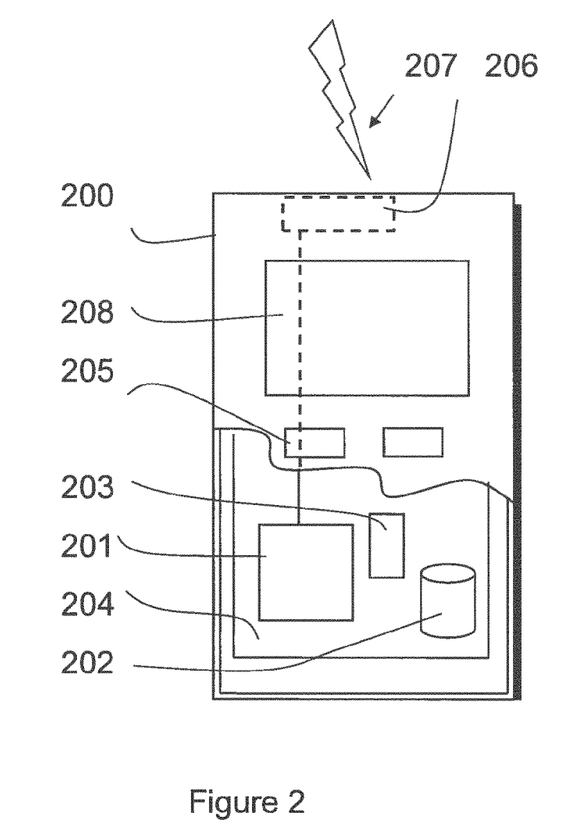
FIG. 2 shows a schematic diagram of a mobile communication device according to some embodiments.

A possible communication device will now be described in more detail with reference to FIG. 2 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like.

The device 102 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs). Other examples of radio access system include those provided by base stations of systems that are based on technologies such as wireless local area network (WLAN) and/or WiMax (Worldwide Interoperability for Microwave Access).

Figure 3:
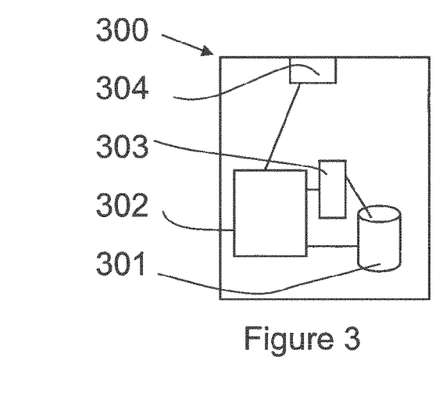
FIG. 3 shows a schematic diagram of a control apparatus according to some embodiments.

FIG. 3 shows an example of a control apparatus 300. This control apparatus may be provided in a base station. The control apparatus can be configured to provide control functions. For this purpose the control apparatus comprises at least one memory 301, at least one data processing unit 302, 303 and an input/output interface 304. Via the interface the control apparatus can be coupled to receive and/or provide data. The control apparatus 300 can be configured to execute an appropriate software code to provide the control functions.

Base stations may communicate via each other via fixed line connection and/or air interface.

Figure 5:
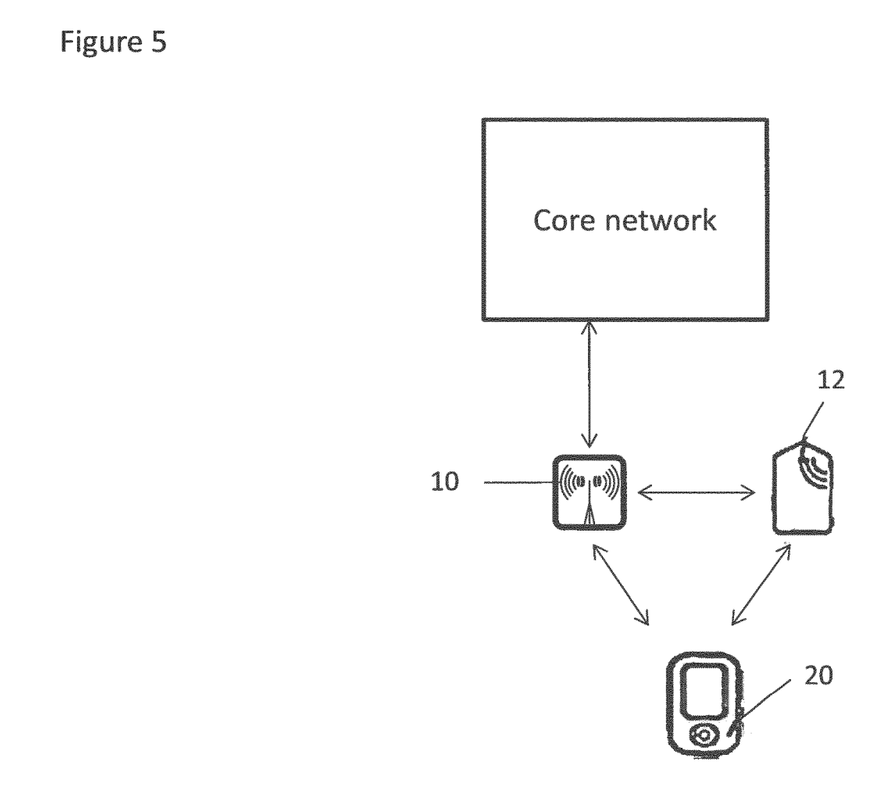
FIG. 5 illustrates the principle of dual connectivity.

FIG. 5 shows an example for dual connectivity where a UE 20 is connected to a master eNB 10 and a secondary eNB 12 simultaneously. The master eNB 10 is in communication with the core network. The secondary eNB is in communication with the core network via the master eNB 10 or may communicate with the core network directly . . . . For User plane option 1A the SeNB may not have a connection to the MME (S1-MME) but it has a connection to the S-GW (S1-U). In user plane option 3C, the SeNB is not in direct communication with the core network. Also, for dual connectivity the master and secondary eNB communicate via an interface (X2).

Some embodiments may relate to dual connectivity of UE. Some embodiments will be described in the context of LTE. It should however be appreciated that some embodiments may be used in the context of other, non LTE systems.

In some embodiments, dual connectivity may enable more flexible resource utilization across eNBs. In dual connectivity a UE is simultaneously connected to both a Master eNB (MeNB), hosting an associated Master Cell Group (MCG), and a Secondary eNB (SeNB) hosting an associated Secondary Cell Group (SCG). The MeNB and SeNB may be connected via a non-ideal backhaul link with transmission delays.

In some dual connectivity scenarios, the UE may be able to simultaneously transmit on different carrier frequencies toward the MeNB and the SeNB. This is because dual-connectivity may assume independent schedulers operating at the MeNB and the SeNB. Due to the X2 latency the UE needs to separately and independently report uplink control information (UCI) such as channel state information (CSI) and HARQ (hybrid automatic repeat request) feedback to the MeNB and the SeNB.

Some embodiments may relate to uplink power control, for example in the case the UE maximum power capabilities are reached due to simultaneous uplink transmissions towards the MeNB and SeNB. Dual-connectivity may be provided in one or other or both of synchronized and unsynchronized networks.

In case of unsynchronized networks, it may not be possible to standardize strict requirements for the maximum time misalignment between uplink sub frames transmitted towards the MeNB and the SeNB. Therefore the handling of power allocation between MeNB and SeNB with dual connectivity in unsynchronized networks may be complex because of lack of synchronicity may make it difficult to coordinate the power allocation between unsynchronized but potentially overlapping sub frames.

It has been proposed that for transmission on a sub frame, the UE should be able to use any unused power from one eNB towards satisfying the power requirement of the second eNB. However, how this could work in practical UE implementations has not been outlined.

PUSCH w/o UCI in MeNB and PUSCH with UCI and/or PUCCH in SeNB

PUSCH with UCI or PUCCH in MeNB and PUSCH with UCI and/or PUCCH in SeNB

It should be appreciated that this is by way of example only. Some embodiments may have two or more different power splits. Different embodiments may additionally or alternatively have different channels and/or different information for one or more power split examples.

In one example the UE may be configured with semi-static power splits between SeNB and MeNB as illustrated in Table 1 below which shows different maximum power split configurations between MeNB and SeNB depending on the uplink channels and/or type of information within transmitted towards MeNB and SeNB in overlapping sub frames.

|      |           | MeNB           |                |                |
| ---- | --------- | -------------- | -------------- | -------------- |
|      |           | PUSCH w/o UCI  | PUSCH with UCI | PUCCH          |
| SeNB | PUSCH w/o | 21.3 dBm (MeNB)$^i$ | 22 dBm (MeNB) | 22.4 dBm (MeNB) |
|      | UCI       | 18 dBm (SeNB)  | 16 dBm (SeNB)  | 14 dBm (SeNB)  |
|      | PUSCH with | 20 dBm (MeNB) | 20.8 dBm (MeNB) | 22 dBm (MeNB) |
|      | UCI       | 20 dBm (SeNB)  | 18 dBm (SeNB)  | 16 dBm (SeNB)  |
|      | PUCCH     | 18.7 dBm (MeNB) | 20.8 dBm (MeNB) | 21.3 dBm (MeNB) |
|      |           | 21 dBm (SeNB)  | 19 dBm (SeNB)  | 18 dBm (SeNB)  |

The inventors have recognized that prior proposals have not considered the different channel combinations on SeNB and MeNB when setting eNB-specific semi-static maximum power limitations. For example, depending on whether or not an overlapping sub frame transmitted towards the MeNB contains the UCI, it may be beneficial to configure different maximum power limitations. By way of example only, this may be for the PUSCH (physical uplink shared channel) transmissions towards the SeNB. This may allow for a higher portion of transmission power on the SeNB if overlapping transmission to MeNB does not include UCI.

In some embodiments, the eNB may configure two (or more) semi-static splits of maximum power between the MeNB and the SeNB. This may depend on one or more of the uplink channels and the type of information within the channel transmitted towards the MeNB and/or the SeNB in one or more overlapping sub frame(s).

In some embodiments, before determining the power to be used for an uplink transmission towards a first eNB, the UE may check if there will be an overlapping UL transmission towards a second eNB which could start later during the sub frame or before the first eNB sub frame due to non-synchronicity between the eNBs.

In some embodiments, if there is an overlap of sub frames, the UE may check which channel types and/or type of information within them will be transmitted towards the first and second eNBs during the overlapping sub frames. UE sets the eNB-specific maximum power limit to be used for uplink transmission towards the first and second eNBs during the overlapping sub frames to the correspondingly configured semi-static split between MeNB and SeNB. In some embodiments, four different power splits between MeNB and SeNB could be configured to be applied in the following four cases:

PUSCH (physical uplink shared channel) without UCI in MeNB and PUSCH without UCI in SeNB PUSCH with UCI and/or PUCCH (physical uplink control channel) in MeNB and PUSCH without UCI in SeNB In these example configurations, it is assumed the sum of the maximum power limits semi-statically allocated to MeNB and SeNB always equal 23 dBm. However any split for which the sum of the semi-statically allocated power limits is below the maximum UE power capabilities is possible. Thus the total power can vary. The allocations to the MeNB and SeNB may be different to those shown which are by way of example only.

Figure 4:
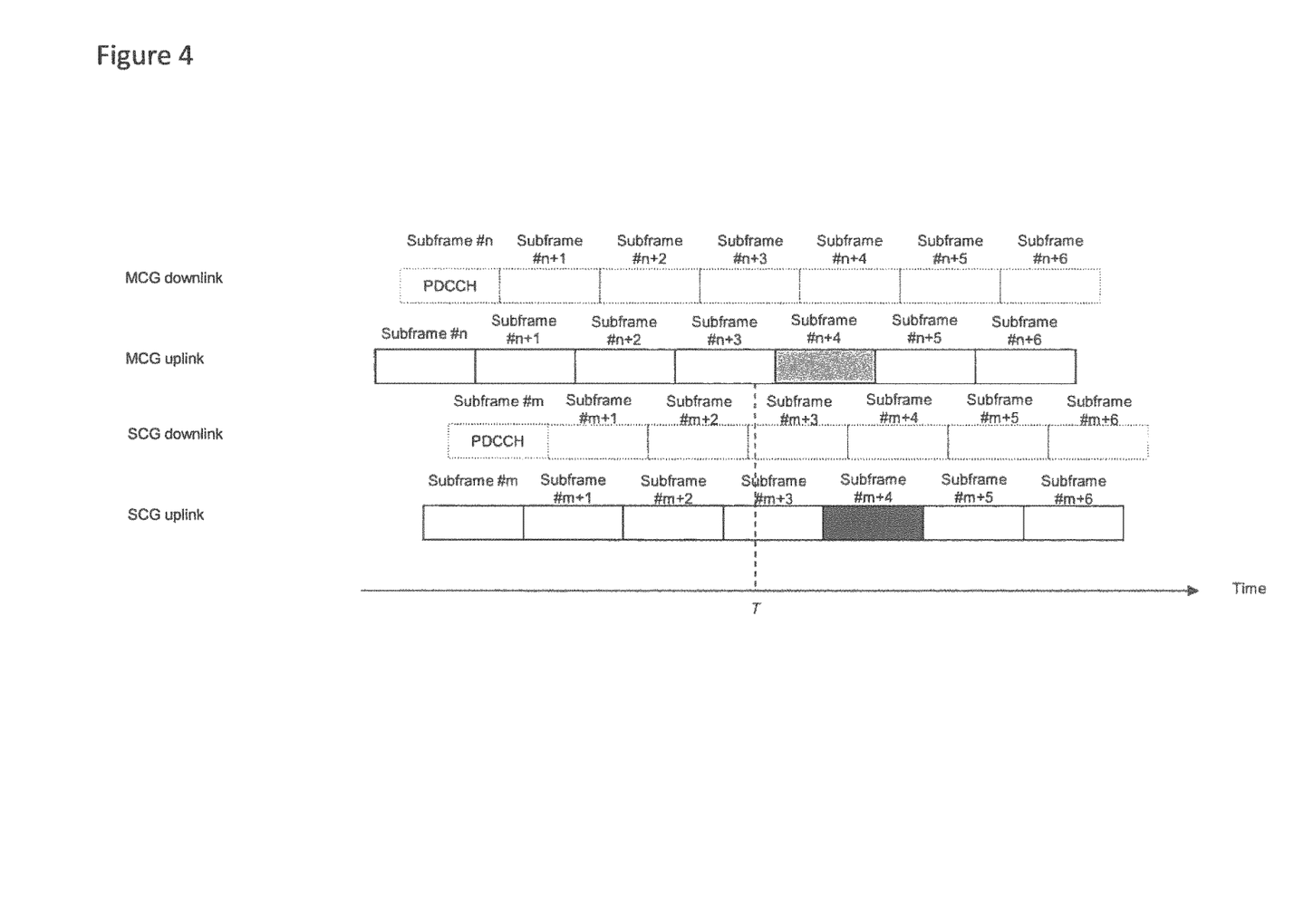
FIG. 4 is a diagram schematically showing the sub frames in uplink and downlink communication in a dual connectivity situation.

Reference is made to FIG. 4 which schematically shows the MCG (master cell group) DL (downlink) sub frames in line 1, the MCG UL (uplink) sub frames in line 2, the SCG (secondary cell group) DL sub frames in line 4 and the SCG UL sub frames in line 4.

In DL sub frames #n of the MCG DL, in FIG. 1 the UE receives a PDCCH allocation from the MCG indicating a PDSCH allocation for which the UE will need to report ACK/NACK feedback in UL sub frame #n+4 of the MCG UL and/or a PUSCH allocation for which the UE will need to start UL transmission during UL sub frame #n+4 of the MCG UL.

Similarly, in DL sub frames #m of the SCG DL the UE receives a PDCCH allocation from the SCG indicating a PDSCH allocation for which the UE will need to report ACK/NACK feedback in UL sub frame #m+4 of the SCG UL and/or a PUSCH allocation for which the UE will need to start UL transmission during UL sub frame #m+4 of the SCG UL.

At time instant T the UE needs to set the UL transmission power to be used for uplink transmission towards the MeNB in MCG UL sub frame #n+4. The UE detects that there will be an overlapping transmission towards the SeNB during SCG UL sub frame #m+4.

Depending on the uplink channels and/or the type of information within that need to be transmitted towards the MeNB in MCG UL sub frame #n+4 and towards SeNB in SCG UL sub frame #m+4, the UE determines using table 1 the MeNB maximum power limit to be used for setting the transmission power in MCG UL sub frame #n+4. The actual setting of transmission power may follow the typical single-cell UL power control rules/functions. However, the maximum power cannot exceed the maximum power limit defined in the table.

In one embodiment the UE determines at time instant T from Table 1 the SeNB maximum power limit to be used for setting the transmission power in SCG UL sub frame #m+4. Again, the actual setting of transmission power may follow the typical single-cell UL power control rules/functions. However, the maximum power cannot exceed the maximum power limit defined in the table.

In another embodiment, when setting the transmission power in SCG UL sub frame #m+4 the UE is allowed to use all the unused transmission power in MCG UL sub frame #n+4 regardless of what semi-static power split was derived at time instant T. This may be provided that there is no overlapping uplink transmission with MCG UL sub frame #n+5 or transmission power requirement towards MeNB during UL sub frame #n+5 that the transmission power does not exceed the one in sub frame #n+4 or that the allowed transmission power excess which the SeNB is allowed to use is determined by the minimum left over transmission power towards the MeNB during sub frames #n+4 and #n+5.

In one embodiment, if an unsynchronized network is used and the UL sub frame boundaries are not aligned, the UE checks which channels to the second eNB overlap with the transmission to the first eNB and selects a lower power limit. For example in FIG. 4, when the UE transmits SCG uplink sub frame m+4 it checks which channel is transmitted in the MCG uplink n+4 sub frame and also which channel is transmitted in the MCG UL sub frame n+5, because they both overlap with SCG UL sub frame m+4. The power split configuration used for SCG in UL sub frame m+4 is the one that results in lower transmission power.

In one embodiment the semi-static power splits in Table 1 can be configured by the MeNB using RRC signaling. In this case the eNB may also decide the specific channel combinations for which to configure different power splits. Channel combinations (and corresponding power splits) may also take into account whether CA (carrier aggregation) is configured in the corresponding eNB.

In another embodiment, the channel combinations and/or the corresponding power splits are fixed by standardized specifications.

One advantage of some embodiments is that it allows configuration of different maximum power splits between the MeNB and SeNB so that e.g. more power can be reserved for PUSCH transmissions towards the SeNB if the MeNB is simultaneously transmitting a low priority channel (i.e. SRS sounding reference symbol) as compared to a high priority channel (e.g. PUCCH).

In another embodiment, instead of or in addition to channel priorities the semi-static power split could be based on the expected power need, e.g., PUCCH could be expected to need less power than PUSCH and thus semi-static power towards for example the MeNB could be higher if only PUCCH or SRS is transmitted towards the SeNB.

In some embodiments, the number of combinations could be smaller than four and may be two or more. For example, there combinations could be:
  PUSCH without UCI in MeNB and PUSCH/PUCCH in SeNB
  PUSCH with UCI or PUCCH in MeNB and PUSCH/PUCCH in SeNB
  or
  PUSCH in MeNB and PUSCH/PUCCH in SeNB
  PUCCH in MeNB and PUSCH/PUCCH in SeNB In these embodiments, only the transmission to MeNB determines the power split regardless of the transmission to SeNB. Alternatively, the power split could be determined only based the content/transmission towards SeNB.

Figure 6:
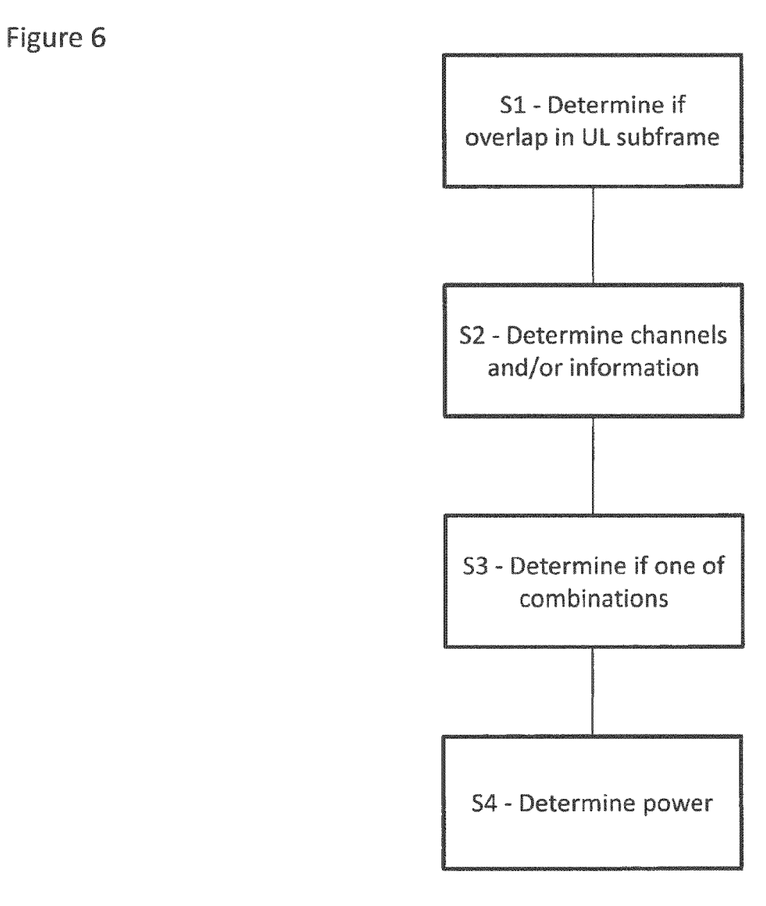
FIG. 6 shows a method of an embodiment.

Reference is made to FIG. 6 which shows a method of an embodiment.

In step S1, a determination may be made that there is overlap between the UL sub frames of the MeNB and the SeNB in which the UE is to transmit.

In step S2, a determination may be made as to which channel(s) are being transmitted in the overlapping sub frames and/or the information being carried.

In step S3, it is determined if the channels and/or information fall into one of the combinations.

In step S4, the power for at least one of the uplink transmissions is determined as discussed previously.

It should be appreciated that step S1, and S2 can be carried out in either order or at the same time. Step S3 may be performed at the same time as step S2.

One or more of the steps of the method of FIG. 6 may be carried out by the at least one processor and at least one memory of the UE.

It should be appreciated that embodiments may be used in any scenario where a UE transmits to two or more cells and/or two or more base stations.

Some embodiments may be used with synchronised networks.

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
  determining a first transmission power for a first transmission from a user equipment and a second transmission power for a second transmission from said user equipment, said first transmission and second transmission at least partially overlapping, and based on the at least partially overlapping transmissions, a second transmission power for the second transmission is selected in dependence on at least one of one or more channels over which the first transmission and the second transmission are being transmitted and a type of information being transmitted on said one or more channels,
  wherein said determining comprises determining, based on the at least one of the one or more channels and the type of information being transmitted in said first transmission and in said second transmission, one combination of a plurality of combinations for which maximum transmit powers are predefined, wherein each of the plurality of combinations sets a predefined maximum power limit for each of said first transmission and said second transmission; and based on the determining, selecting a power limit associated with the predefined maximum power limit and using the selected power limit for transmission of each of said first transmission and said second transmission over the determined combination.

2. A method as claimed in claim 1, wherein said first transmission is to a first base station and said second transmission is to a second base station.

3. A method as claimed in claim 1 wherein said first transmission is to a master base station and said second transmission is to a secondary base station.

4. A method as claimed in claim 1 comprising using information on at least one of a first maximum power for said first transmission and a second maximum power for said second transmission to determine at least one of said first transmission power and said second transmission power.

5. A method as claimed in claim 4, wherein one of said first and second power exceed said respective maximum power if the other of said first and second power is less than its respective maximum power.

6. A method as claimed in claim 5, wherein said first power together with said second power is less than or equal to a total maximum power.

7. A method as claimed in claim 4, wherein said first maximum power and said second maximum power is set in dependence on a type of information received from a base station.

8. A method as claimed in claim 1, wherein said one or more channels comprises one or more of a physical uplink shared channel and a physical uplink control channel.

9. A method as claimed in claim 1, wherein said type of information comprises one or more of uplink control information.

10. A method as claimed in claim 1, wherein said plurality of combinations comprise one or more of:
physical uplink shared channel without uplink control information for the first transmission and physical uplink shared channel without uplink control information for the second transmission;
physical uplink shared channel with at least one of uplink control information and physical uplink control channel for the first transmission and physical uplink control channel without uplink control information for the second transmission;
physical uplink shared channel without uplink control information for the first transmission and physical uplink shared channel with at least one of uplink control information and physical uplink control channel for the second transmission;
physical uplink shared channel with uplink control information or physical uplink control channel for the first transmission and physical uplink shared channel with uplink control information or physical uplink control channel for the second transmission
physical uplink shared channel without uplink control information for the first transmission and at least one of a physical uplink shared channel and physical uplink control channel in the second transmission;
physical uplink shared channel with at least one of uplink control information and physical uplink control channel for the first transmission and at least one of physical uplink shared channel and physical uplink control channel in the second transmission;
physical uplink shared channel for the first transmission and at least one of a physical uplink shared channel and physical uplink control channel in the second transmission; and
physical uplink control channel for the first transmission and at least one of a physical uplink shared channel and physical uplink control channel for the second transmission.

11. A method as claimed in claim 1, wherein said user equipment is in a dual connectivity mode.

12. A computer program stored on a non-transitory medium comprising computer executable instructions which when run cause the method of claim 1 to be performed.

13. A method comprising:
configuring a plurality of maximum power splits between a first base station and a second base station for at least partially overlapping transmissions from a user equipment to said first base station and said second base station;
determining information on each of said plurality of maximum power splits being dependent on at least one of one or more channel to be transmitted by said user equipment and a type of information provided on a respective channel, at least one of the plurality of maximum power splits defining at least one of a first maximum transmission power to said first base station and a second maximum transmission power to said second base station, wherein said plurality of maximum power splits is associated with a different combination used for the one or more channel, the different combination based on at least one of the one or more channels and the type of information provided in the one or more channel, and wherein the different combination sets a predefined maximum power limit for each of the one or more channel; and
based on the information, determining a power limit for transmission of each of said first transmission and second transmission.

14. A method as claimed in claim 13, comprising providing information on said plurality of maximum power splits to said user equipment.

15. A method as claimed in claim 13, each of said maximum power split is further associated with a different combination of at least one of one or more channels and a type of information being transmitted in said first transmission and at least one of one or more channel and a type of information being transmitted in said second transmission.

16. An apparatus comprising
at least one processor and
at least one non-transitory memory including computer code for one or more programs, the at least one memory and the computer code configured, with the at least one processor, to cause the apparatus to:
configure a plurality of maximum power splits between a first base station and a second base station for at least partially overlapping transmissions from a user equipment to said first base station and said second base station;
determine information on each of said plurality of maximum power splits being dependent on one or more channel to be transmitted by said user equipment and a type of information provided on a respective channel, at least one of the plurality of maximum power splits defining at least one of a first maximum transmission power to said first base station and a second maximum transmission power to said second base station, wherein said plurality of maximum power splits is associated with a different combination used for the one or more channels, the different combination based on at least one of the one or more channels and the type of information provided in the one or more channels, and wherein the different combination sets a predefined maximum power limit for each of the one or more channels; and based on the information, select a power limit associated with the predefined maximum power limit and using the selected power limit for transmission of each of said first transmission and second transmission.

17. An apparatus comprising at least one processor and at least one non-transitory memory including computer code for one or more programs, the at least one memory and the computer code configured, with the at least one processor, to cause the apparatus to:

determine a first transmission power for a first transmission from a user equipment and a second transmission power for a second transmission from said user equipment, said first transmission and second transmission at least partially overlapping, said first transmission and second transmission power being selected in dependence on at least one of one or more channels over which the first transmission and the second transmission are being transmitted and a type of information being transmitted on said one or more channels, wherein the determining comprises determining, based on the at least one of the one or more channels and the type of information being transmitted in said first transmission in said second transmission, one combination of a plurality of combinations for which maximum transmit powers are predefined, wherein each of the plurality of combinations sets a predefined maximum power limit for each of said first transmission and said second transmission; and based on the determining, select a power limit associated with the predefined maximum power limit and using the selected power limit for transmission of each of said first transmission and said second transmission over the determined combination.

18. An apparatus as in claim 17 where the at least one processor and the computer code are configured to cause the apparatus to use information on at least one of a first maximum power for said first transmission and a second maximum power for said second transmission to determine at least one of said first transmission power and said second transmission power.

* * * * *